United States Patent [19]

Ishida et al.

[11] Patent Number: 5,250,478

[45] Date of Patent: * Oct. 5, 1993

[54] ALUMINUM NITRIDE SINTERED BODY AND PROCESS FOR PREPARATION THEREOF

[75] Inventors: Masanobu Ishida; Yoshihiro Okawa, both of Kokubu, Japan

[73] Assignee: Kyocera Corporation, Kyoto, Japan

[*] Notice: The portion of the term of this patent subsequent to Dec. 31, 2008 has been disclaimed.

[21] Appl. No.: 824,681

[22] Filed: Jan. 17, 1992

Related U.S. Application Data

[63] Continuation of Ser. No. 386,789, Jul. 27, 1989, abandoned.

[30] Foreign Application Priority Data

Jul. 28, 1988 [JP] Japan .................. 1-189133
Apr. 18, 1989 [JP] Japan .................. 1-98495
Apr. 18, 1989 [JP] Japan .................. 63-98496

[51] Int. Cl.$^5$ .............................. C04B 35/58
[52] U.S. Cl. .............................. 501/98; 501/152; 501/153
[58] Field of Search .............. 501/96, 98, 152, 153

[56] References Cited

U.S. PATENT DOCUMENTS

| | | | |
|---|---|---|---|
| 4,650,777 | 3/1987 | Kurokawa et al. | 501/96 |
| 4,698,320 | 10/1987 | Kasori et al. | 501/96 |
| 4,705,762 | 11/1987 | Ota et al. | 501/87 |
| 4,711,861 | 12/1987 | Sawamura et al. | 501/98 |
| 4,764,321 | 8/1988 | Huseby et al. | 264/65 |
| 4,766,097 | 8/1998 | Shinozaki | 501/98 |
| 4,795,724 | 1/1989 | Soma et al. | 501/98 |
| 4,810,679 | 3/1989 | Dole et al. | 501/98 |
| 5,077,245 | 12/1991 | Miyahara | 501/96 |

FOREIGN PATENT DOCUMENTS 56121978 7/1984 Japan .
2179677 8/1986 United Kingdom .

Primary Examiner—Karl Group
Assistant Examiner—Deborah Jones
Attorney, Agent, or Firm—Spensley Horn Jubas & Lubitz

[57] ABSTRACT

Disclosed is an aluminum nitride sintered body comprising aluminum nitride and a sintering aid, wherein the sintering aid is composed mainly of at least one component selected, as the oxide, from the group consisting of $Yb_2O_3$ and $Er_2O_3$, and the sintered body contains up to 0.5% by weight of Yb and/or Er as the metal and has a density of 3.2 to 3.3 g/cm$^3$ and a heat conductivity of at least 170 W/m·k.

If a CaO component is incorporated as the second sintering aid in an amount of up to 0.1% by weight, the heat conductivity is further increased.

36 Claims, 1 Drawing Sheet

AMOUNT OF RESIDUAL SINTERING AID
(CALCULATED AS METAL)

ALUMINUM NITRIDE SINTERED BODY AND PROCESS FOR PREPARATION THEREOF

This is a continuation of application Ser. No. 07/386,789 filed on Jul. 27, 1989, now abandoned.

BACKGROUND OF THE INVENTION (1) Field of the Invention

The present invention relates to an aluminum nitride sintered body and a process for the preparation thereof. More particularly, the present invention relates to an aluminum nitride sintered body having a high heat conductivity, which is suitable as an electronic part material for a radiating substrate or the like, and a process for the preparation thereof.

(2) Description of the Related Art

With recent increase of the performance and processing speed in information-processing devices, increase of the density and integration degree has been promptly advanced in semiconductor integration circuits constituting these information-processing devices. Accordingly, a large electric power becomes necessary for a semiconductor integrated circuit element and the quantity of heat generated in the element is drastically increased. Therefore, in order to operate the semiconductor integrated circuit element normally and stably, it is very important to remove generated heat efficiently.

In a conventional semiconductor package comprising alumina as a substrate, the heat conductivity is low and the radiation of heat is insufficient. Therefore, a beryllium oxide sintered body has been proposed as a ceramic material having a high heat conductivity. However, use of this sintered body is restricted because of its toxicity.

An aluminum nitride sintered body now attracts attention as a highly heat-conductive substrate material that can be used instead of the beryllium oxide sintered body, because this sintered body has a high mechanical strength within a broad temperature range of from normal temperature to high temperatures, a high electrically insulating property, a high heat conductivity and a thermal expansion coefficient closer to that of a single crystal of silicon than alumina.

However, aluminum nitride inherently has a hardly sintering property, and when aluminum nitride alone is used, it is difficult to obtain a high-density sintered body having a high heat conductivity. Accordingly, a sintered body has been obtained by incorporating, as a sintering aid, a compound of an element of group IIa or IIIa of the Periodic Table, for example, a compound of an alkaline earth metal such as calcium, strontium or barium, or yttrium or a rare earth element, to the starting material powder of aluminum nitride.

For example, U.S. Pat. No. 4,478,785 proposes a process in which a composition formed by adding carbon to aluminum nitride powder is molded and sintered to remove oxygen (contained in the form of aluminum oxide) contained in the starting aluminum nitride and improve the heat conductivity of the sintered body. However, this proposal is still insufficient in that the action of the sintering aid is not satisfactory, the density of the sintered body is low and the heat conductivity is rather degraded.

U.S. Pat. No. 4,547,471 discloses a process in which a composition formed by adding $Y_2O_3$ as a sintering aid to aluminum nitride powder is molded and sintered. According to this process, a sintered body having a high density can be obtained, but the heat conductivity of the sintered body is still insufficient. The reason is that the sintering aid reacts with an oxide phase contained in aluminum nitride to form a grain boundary phase and promote sintering of aluminum nitride but the sintering aid is still left in the grain boundary phase even after termination of sintering. Accordingly, color unevenness and stain are observed in the sintered body and the heat conductivity is locally uneven. Therefore, the process is defective in that a sintered body having a good heat conductivity cannot be prepared easily and stably.

U.S. Pat. No. 4,746,637 discloses a process in which a composition formed by incorporating a compound of a metal of group IIa of the Periodic Table, such as calcium, strontium or barium and a compound of a metal of group IIIa of the Periodic Table, such as yttrium or other rare earth element, in a starting powder of aluminum nitride is molded and sintered. Also in this process, the sintering aid reacts with the oxide phase on the surface of aluminum nitride and is left as the grain boundary layer, and the above-mentioned defect is similarly caused.

A process in which the amount of the sintering aid is reduced as much as possible to decrease the grain boundary phase can be considered as means for eliminating the above-mentioned defect. However, since the sintering aid is an element indispensable for sintering aluminum nitride, if the amount of the sintering aid is too small, a sintered body having a high density cannot be obtained.

SUMMARY OF THE INVENTION

It is therefore a primary object of the present invention to provide an aluminum nitride sintered body in which the above-mentioned defects of the conventional aluminum nitride sintered bodies are eliminated and which has a high heat conductivity and a high density in combination and is uniform and excellent in appearance characteristics, and a process for the preparation of this aluminum nitride sintered body.

Another object of the present invention is to provide a process for the preparation of an aluminum nitride sintered body, in which the grain boundary phase is reduced as much as possible in the formed sintered body without degrading the sintering property of aluminum nitride and the unevenness of the grain boundary phase is eliminated.

We made research with a view to solving the foregoing problems involved in the conventional techniques, and as the result, we found that the evaporation rate of the used sintering aid at the sintering temperature of aluminum nitride has great influences on the amount of the grain boundary phase left in the sintered body and the unevenness of the residual grain boundary phase. We furthered our research based on this finding, and as the result, we found that if $Yb_2O_3$ or $Er_2O_3$ as a metal compound having an evaporation rate of $10^{-6}$ to $10^{-3}$ g/cm$^2$·sec at a temperature of 1900° C. is used as the sintering aid, this sintering aid is incorporated in an amount enough to form sufficiently a liquid phase in an amount required for sintering at the firing step and the sintering aid is evaporated during the firing step, the grain boundary phase is reduced as much as possible, the unevenness of the grain boundary phase is substantially eliminated and a high density and a high heat conductivity can be attained. We have now completed the present invention based on these findings.

More specifically, in accordance with one aspect of the present invention, there is provided an aluminum nitride sintered body comprising aluminum nitride and a sintering aid, wherein the sintering aid is composed mainly of at least one component selected, as the oxide, from the group consisting of $Yb_2O_3$ and $Er_2O_3$, and the sintered body contains up to 0.5% by weight of Yb and/or Er as the metal and has a density of 3.2 to 3.3 $g/cm^3$ and a heat conductivity of at least 170 W/m·K.

In accordance with another aspect of the present invention, there is provided an aluminum nitride sintered body comprising aluminum nitride and a sintering aid, wherein the sintering aid is composed mainly of at least one component selected, as the oxide, from the group consisting of $Yb_2O_3$ and $Er_2O_3$ and a CaO component, and the sintered body contains up to 0.5% by weight of Yb and/or Er as the metal and up to 0.1% by weight of Ca as the metal and has a density of 3.2 to 3.3 $g/cm^3$ and a heat conductivity of at least 170 W/m·K.

In accordance with still another aspect of the present invention, there is provided a process for the preparation of an aluminum nitride sintered body, which comprises molding a composition comprising 84 to 97% by weight of aluminum nitride powder and 3 to 15% by weight of a first sintering aid selected from the group consisting of $Yb_2O_3$ and $Er_2O_3$ and optionally, 0.01 to 0.2% by weight, as CaO, of a calcium compound capable of being converted to CaO under sintering conditions as a second sintering aid, firing the obtained molded body at a temperature of 1600° to 2000° C. in an non-oxidizing atmosphere containing at least 1 Torr of nitrogen gas, and thereby evaporating the sintering aid until the content of Yb and/or Er in the sintered body is up to 0.5% by weight and, if the second sintering aid is used, the content of Ca is up to 0.1% by weight.

DETAILED DESCRIPTION OF THE PREFERRED EMBODIMENTS

Figure 1:
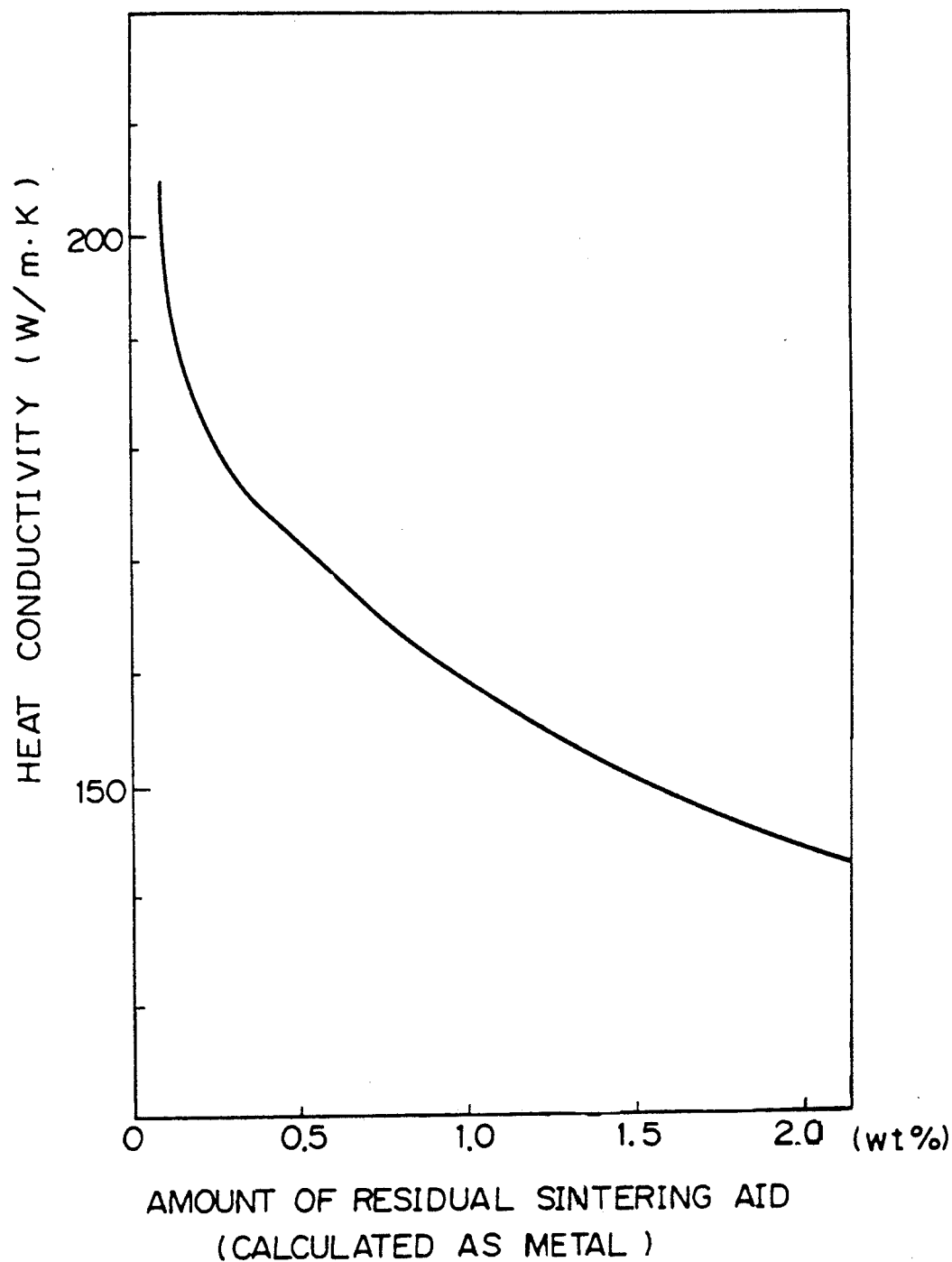
FIG. 1 is a diagram illustrating the relation between the amount of the residual sintering aid (calculated as the metal) and the heat conductivity.

The important feature of the present invention resides in that at least one of $Er_2O_3$ and $Yb_2O_3$ is used as a metal or metal compound having an evaporation rate of $10^{-6}$ to $10^{-3}$ g/cm²·sec, especially $10^{-5}$ to $10^{-4}$ g/cm² sec, at 1900° C. as the first sintering aid singly or in combination with CaO, and that at the step of firing the molded body, the sintering aid used in evaporated from the sintered body below a certain level.

The evaporation rate is a datum obtained from a sintered body in vacuum, as described in the literature reference [Inorg. Mat. 11(7), pages 1143-1144 (1975) and 12(1), page 122 (1976)]. According to the literature reference, the evaporation rates at 1900° C. of $Yb_2O_3$ and $Er_2O_3$ are $2.3 \times 10^{-5}$ g/cm²·sec and $1.2 \times 10^{-5}$ g/cm²·sec, respectively. But the evaporation rate of $Y_2O_3$ customarily used is as small as $8.0 \times 10^{-8}$ g/cm² sec. In order to reduce the amount of the grain boundary in the final sintered body while performing sintering completely, it is important the evaporation rate of the sintering aid should be high. In the present invention, it is preferred that $Yb_2O_3$ and/or $Er_2O_3$ be used in combination with CaO, because the sintering property of the composition is further improved, the sintering temperature can be set at a lower level and the heat conductivity of the final sintered body can be further improved.

In the present invention, the sintering aid is a component indispensable for obtaining a sintered body having a high density, but as is apparent from the results shown in FIG. 1 described hereinafter, from the viewpoint of the heat conductivity of the final sintered body, it is preferred that the amount of the grain boundary formed from the sintering aid be as small as possible. According to the present invention, the residual amount of the sintering aid is reduced below a certain level by adopting the means of evaporating the sintering aid at the firing step, whereby the heat conductivity is improved.

The aluminum nitride powder used in the present invention is one prepared by the known process, for example, the direct nitriding process or the alumina-reducing process, and the aluminum nitride powder is a powder having an oxygen content lower than 1.5% by weight and a carbon content lower than 0.15% by weight, containing impurities of cations other than aluminum in an amount smaller than 0.1% by weight, especially each of Si and Fe in an amount smaller than 100 ppm, and having an average particle size smaller than 2 μm.

The sintering aid is incorporated into the aluminum nitride powder in such an amount that a liquid phase is sufficiently formed at the firing step. Namely, the starting composition comprises 85 to 97% by weight, especially 90 to 95% by weight, of the aluminum nitride powder and 3 to 15% by weight, especially 5 to 10% by weight, of $Yb_2O_3$ and/or $Er_2O_3$. When CaO or a compound capable of being converted to CaO under sintering conditions is used as the second sintering aid in combination with $Yb_2O_3$ and/or $Er_2O_3$, the second sintering agent is incorporated in an amount of 0.01 to 0.2% by weight as CaO.

The mixed powders are blended in an organic solvent, if desired. In this case, the water content in the organic solvent should be set below 0.4% by weight, whereby the dispersibility of the AlN powder can be improved and oxidation of surfaces of AlN particles by reaction with water in the solvent can be prevented.

The obtained powdery mixture is molded into a desired shape according to the known molding method, for example, press molding using a mold or a hydrostatic pressure, sheet molding or extrusion molding, and the molded body is transferred to the firing step.

Firing is carried out at a temperature of 1600° to 2000° C. for 3 to 50 hours in a non-oxidizing atmosphere containing at least 1 Torr, especially at least 760 Torr, of nitrogen gas. As the firing means, there can be mentioned normal pressure firing and nitrogen gas compression firing. Furthermore, by subjecting the obtained sintered body containing the sintering aid in an amount of up to 0.5% by weight as the metal to hot isostatic pressure firing, the densification can be promoted.

In the present invention, it is preferred that at the firing step, the average temperature-elevating rate in the range of from 1200° C. to the sintering temperature be set at a level lower than 40° C./min and before advance of sintering, an aluminate as the liquid phase component be uniformly formed by the reaction between the sintering aid in the molded body and oxygen on the surface of the aluminum nitride powder. If this average temperature-elevating rate exceeds 40° C./min, the temperature is elevated to the sintering temperature without sufficient formation of the aluminate and the sintering aid is evaporated in this state, with the result that sintering is not sufficiently advanced and a sintered body having a high density cannot be obtained.

In the state where the aluminate is sufficiently formed, sintering is advanced and evaporation of the sintering aid is gradually advanced. In order to leave the liquid phase component until sintering is sufficiently advanced, for example, there can be adopted a method in which the same sintering aid as the sintering aid contained in the molded body is placed in a firing furnace, pressure substantially equal to the vapor pressure of the sintering aid is maintained around the molded body, and after sufficient advance of sintering, the gas in the firing furnace is forcibly substituted and the pressure around the molded body is maintained at a level lower than the vapor pressure of the additive, whereby evaporation of the sintering aid can be promoted.

However, when the evaporation is controlled according to the vapor pressure, the evaporation speed is low and hence, the firing time should be prolonged. Accordingly, carbon is preferably incorporated in the atmosphere, whereby the evaporation is further promoted.

At the firing step, the sintering aid is evaporated so that the final residual amount of the sintering aid is up to 0.5% by weight, especially up to 0.2% by weight, as the metal (Yb or Er). If the second sintering aid is used in combination with the first sintering aid, at the firing step, the evaporation is carried out until the final amount of the first sintering aid is up to 0.5% by weight, preferably up to 0.1% by weight, especially preferably up to 0.04% by weight, as the metal (Yb or Er), and the final amount of the second sintering aid is up to 0.1% by weight, preferably up to 0.05% by weight, especially preferably up to 0.003% by weight, as the Ca metal.

It is preferred that after completion of sintering, the temperature be lowered at an average rate lower than 40° C./min from the sintering temperature to 1200° C. If this method is adopted, formation of the heterogeneous layer on the surface of the sintered body can be obtained.

According to the above-mentioned process, a density of 3.2 to 3.3 g/cm$^3$, especially 3.24 to 3.27 g/cm$^3$, and a heat conductivity of at least 170 W/m·K, especially at least 200 W/m·K, can be attained in the final sintered body.

Even though a sintering aid having a high evaporation rate is used, if firing is carried out so that the evaporation is inhibited at the firing step, the density becomes close to the theoretical density (calculated from the densities of the respective starting powders and the mixing ratio thereof), and the amount of the sintering aid left in the sintered body is large and the heat conductivity is not increased.

The reason why the amount of the sintering aid left in the sintered body is limited to up to 0.5% by weight as the metal is that as is apparent from the relation between the residual amount of the sintering aid and the heat conductivity, shown in FIG. 1, if the amount of the residual sintering aid exceeds 0.5% by weight, the heat conductivity of 170 W/m·K cannot be attained and the sintered body is not uniform. The density lower than 3.2 g/cm$^3$ means the presence of many pores and the density higher than 3.3 g/cm$^3$ means the presence of a large amount of the grain boundary phase.

The reason why $Er_2O_3$ and $Yb_2O_3$ are selected as the sintering aid in the present invention is that in case of other sintering aids such a $Y_2O_3$, they are left as the grain boundary phase in the sintered body even after advance of sintering to cause color unevenness or stain, and the sintered body becomes locally uneven.

The reason why the amount incorporated of the sintering aid of the $Yb_2O_3/Er_2O_3$ type is limited to 3 to 15% by weight is that if the amount incorporated of the sintering aid is smaller than 3% by weight, sufficient densification is not attained in the sintered body and if the amount of the sintering aid exceeds 15% by weight, evaporation of the sintering aid becomes difficult and a large amount of the grain boundary phase is left, with the result that the heat conductivity is lowered and an uneven sintered body is formed.

The reason why the amount of the first sintering aid left in the sintered body is limited to up to 0.1% by weight as the Yb or Er metal and the amount of the second sintering aid is limited to up to 0.05% by weight as the Ca metal in the preferred embodiment of the present invention is that if the residual amount of the first sintering aid exceeds 0.1% by weight as the Er or Yb metal and the residual amount of the second sintering aid exceeds 0.05% by weight as the Ca metal, the heat conductivity of 200 W/m·K is not attained and the sintered body tends to become heterogeneous.

In order to obtain a sintered body having a high density, the residual amount of the sintering aid should be at least 0.01% by weight, especially at least 0.02% by weight, and when the second sintering aid is used in combination with the first sintering aid, the residual amount of the second sintering aid should be at least 0.0005% by weight, especially at least 0.001% by weight, as the Ca metal.

Incidentally, it must be understood that all of the sintering aids can be used not only in the form of oxides such as $Yb_2O_3$, $Er_2O_3$ and CaO but also in the form of compounds capable of being converted to oxides under firing conditions, for example, carbonates, nitrates and hydroxides.

As is apparent from the foregoing detailed description, the aluminum nitride sintered body of the present invention has a high density, an excellent heat conductivity and good thermal characteristics, electrical characteristics and mechanical characteristics, and the starting material cost is low and unevenness of the characteristics is not caused according to the kinds of starting materials. Moreover, the aluminum nitride sintered body of the present invention can be manufactured easily and stably and is valuable and advantageous as an electronic part material, for example, an insulating substrate on which electronic parts are mounted.

The present invention will now be described in detail with reference to the following examples that by no means limit the scope of the invention.

EXAMPLE 1

A commercially available starting aluminum nitride powder having an oxygen content lower than 1.5% by weight and a carbon content lower than 0.15% by weight, in which the content of cation impurities other than aluminum was lower than 0.1% by weight, was mixed with a metal oxide having an evaporation rate shown in Table 1 in an amount shown in Table 1. The obtained powder mixture was compressed under a pressure of 1000 kg/cm$^2$ at room temperature to form a molded body. The molded body was fired under atmospheric pressure at 1900° C. in a nitrogen gas atmosphere containing carbon. The temperature was elevated at a temperature-elevating rate of 20° C./min from 1200° C. to the sintering temperature at the firing step.

It was confirmed with respect to each sample that a reaction product (aluminate) with $Al_2O_3$ was formed at this temperature-elevating rate. After arrival at the sintering temperature, firing was carried out in the state where the atmosphere was substituted with nitrogen gas. The rate of dropping of the temperature to 1200° C. was set at 20° C./min. In sample No. 13, carbon was not incorporated in the atmosphere. With respect to the obtained aluminum nitride sintered body, the density was measured by the Archimedian method, the heat conductivity was measured by the laser flash method, and the ratio of occurrence of color unevenness and stain was determined by the observation using a binocular microscope. The obtained results are shown in Table 1.

Furthermore, the amount of the sintering aid (as the metal) in the sintered body was measured by the ICI emission spectroscopic analysis. The obtained results are shown in Table 1.

TABLE 1

| Sample No. | Sintering aid | Evaporation rate ($g/cm^2 \cdot sec$) | Amount added (wt %) | Apparent density ($g/cm^3$) | Heat conductivity ($W/m \cdot k$) | Ratio (%) of occurrence of color unevenness and stain | Amount (% by weight) of sintering aid (as metal) |
|---|---|---|---|---|---|---|---|
| *1 | $Y_2O_3$ | *$8.0 \times 10^{-8}$ | 5 | 3.29 | *153 | *68.5 | *2.1 |
| *2 | $Y_2O_3$ | *$8.0 \times 10^{-8}$ | 7 | *3.31 | *148 | *82.0 | *2.6 |
| 3 | $Er_2O_3$ | $1.2 \times 10^{-5}$ | 5 | 3.26 | 183 | 0.0 | 0.2 |
| 4 | $Er_2O_3$ | $1.2 \times 10^{-5}$ | 7 | 3.26 | 187 | 0.0 | 0.2 |
| 5 | $Er_2O_3$ | $1.2 \times 10^{-5}$ | 10 | 3.26 | 188 | 0.0 | 0.2 |
| *6 | $Yb_2O_3$ | $2.3 \times 10^{-5}$ | *1 | *3.18 | *129 | 0.0 | 0.1 |
| 7 | $Yb_2O_3$ | $2.3 \times 10^{-5}$ | 3 | 3.25 | 172 | 0.0 | 0.1 |
| 8 | $Yb_2O_3$ | $2.3 \times 10^{-5}$ | 5 | 3.26 | 186 | 0.0 | 0.1 |
| 9 | $Yb_2O_3$ | $2.3 \times 10^{-5}$ | 7 | 3.26 | 198 | 0.0 | 0.1 |
| 10 | $Yb_2O_3$ | $2.3 \times 10^{-5}$ | 10 | 3.26 | 198 | 0.0 | 0.1 |
| 11 | $Yb_2O_3$ | $2.3 \times 10^{-5}$ | 15 | 3.27 | 174 | 0.0 | 0.3 |
| *12 | $Yb_2O_3$ | $2.3 \times 10^{-5}$ | *20 | *3.31 | *153 | *13.9 | *1.2 |
| *13 | $Yb_2O_3$ | $2.3 \times 10^{-5}$ | 7 | 3.30 | *150 | *23.4 | *1.1 |

Note
*outside scope of the present invention

As is apparent from the results shown in Table 1, in each of sample No. 1 and sample No. 2 where $Y_2O_3$ having an evaporation rate lower than $10^{-6}$ $g/cm^2$·sec at 1900° C. was used, the density was high, but the sintering aid was left in an amount larger than 2.0% by weight, and occurrence of color unevenness and stain was conspicuous and the heat conductivity was low.

In sample No. 6 where the amount added of the sintering aid was smaller than 3% by weight, sintering was insufficient and a high heat conductivity was not attained. In sample No. 12 where the amount added of the sintering aid was larger than 15% by weight, the residual amount of the sintering aid was large and occurrence of color unevenness and stain was observed. It also was found that even if the amount added of the sintering aid was in the range of from 3 to 15% by weight, in sample No. 13 where evaporation was inhibited, the residual amount of the sintering aid exceeded 0.5% by weight and no high heat conductivity could be obtained.

In each of sample Nos. 3 through 5 and 7 through 11 according to the present invention, the apparent density was 3.2 to 3.3 $g/cm^3$ and the heat conductivity was at least 170 W/m·k, and occurrence of color unevenness and stain was not observed. Incidentally, the relation between the residual amount of the sintering aid (as the metal) and the heat conductivity, determined based on the data shown in Table 1, is illustrated as the mean tendency, which differs to some extent according to the apparent density.

EXAMPLE 2

A commercially available starting aluminum nitride powder having an oxygen content lower than 1.5% by weight and a carbon content lower than 0.15% by weight, in which the content of cation impurities other than aluminum was lower than 0.1% by weight, was mixed with $Er_2O_3$ and $CaCO_3$ in amounts shown in Table 2. The obtained powder mixture was compressed under a pressure of 1000 $kg/cm^2$ at room temperature to form a molded body. The molded body was fired under atmospheric pressure at 1900° C. in a nitrogen gas atmosphere containing carbon. The temperature was elevated at a temperature-elevating rate of 20° C./min from 1200° C. to the sintering temperature at the firing step.

It was confirmed with respect to each sample that a reaction product (aluminate) with $Al_2O_3$ was formed at this temperature-elevating rate. After arrival at the sintering temperature, firing was carried out in the state where the atmosphere was substituted with nitrogen gas. The rate of dropping of the temperature to 1200° C. was set at 20° C./min. In sample No. 16, carbon was not incorporated in the atmosphere. With respect to the obtained aluminum nitride sintered body, the density was measured by the Archimedian method, the heat conductivity was measured by the laser flash method, and the ratio of occurrence of color unevenness and stain was determined by the observation using a binocular microscope. The obtained results are shown in Table 2.

Furthermore, the amount of the sintering aid (as the metal) in the sintering body was measured by the ICI emission spectroscopic analysis. The obtained results are shown in Table 2.

TABLE 2

| | Composition (% by weight) | | | Properties of Sintered Body | | | | |
|---|---|---|---|---|---|---|---|---|
| Sample No. | AlN | $Er_2O_3$ | $CaCO_3$ | apparent density ($g/cm^3$) | heat conductivity ($W/m \cdot k$) | residual amount (% by weight) of Er | residual amount (% by weight) of Ca | ratio (%) of occurrence of color unevenness and stain |
| *1 | 98.825 | 1.0 | 0.175 | 3.13 | 142 | 0.01 | 0.003 | 0.0 |

TABLE 2-continued

| Sample No. | Composition (% by weight) | | | Properties of Sintered Body | | | | |
|---|---|---|---|---|---|---|---|---|
| | AlN | Er$_2$O$_3$ | CaCO$_3$ | apparent density (g/cm$^3$) | heat conductivity (W/m·k) | residual amount (% by weight of Er) | residual amount (% by weight of Ca) | ratio (%) of occurrence of color unevenness and stain |
| 2 | 96.825 | 3.0 | 0.175 | 3.25 | 222 | 0.02 | 0.003 | 0.0 |
| 3 | 94.825 | 5.0 | 0.175 | 3.26 | 231 | 0.02 | 0.002 | 0.0 |
| 4 | 92.825 | 7.0 | 0.175 | 3.26 | 240 | 0.03 | 0.003 | 0.0 |
| 5 | 89.825 | 10.0 | 0.175 | 3.26 | 248 | 0.03 | 0.001 | 0.0 |
| 6 | 84.825 | 15.0 | 0.175 | 3.26 | 242 | 0.05 | 0.003 | 0.0 |
| *7 | 79.825 | 20.0 | 0.175 | 3.32 | 165 | 0.65 | 0.005 | 18.5 |
| 8 | 92.99 | 7.0 | 0.01 | 3.26 | 221 | 0.03 | 0.002 | 0.0 |
| 9 | 92.95 | 7.0 | 0.05 | 3.26 | 235 | 0.03 | 0.003 | 0.0 |
| 10 | 92.90 | 7.0 | 0.10 | 3.26 | 239 | 0.03 | 0.004 | 0.0 |
| 11 | 92.85 | 7.0 | 0.15 | 3.26 | 240 | 0.03 | 0.002 | 0.0 |
| 12 | 92.80 | 7.0 | 0.18 | 3.26 | 242 | 0.03 | 0.005 | 0.0 |
| 13 | 92.50 | 7.0 | 0.20 | 3.26 | 198 | 0.03 | 0.014 | 0.0 |
| *14 | 92.825 | 7.0 | 0.175 | 3.34 | 158 | 3.21 | 0.145 | 25.0 |
| | | Y$_2$O$_3$ | | | | Y | | |
| *15 | 94.825 | 5.0 | 0.175 | 3.29 | 194 | 2.1 | 0.02 | 67.0 |
| *16 | 92.825 | 7.0 | 0.175 | 3.31 | 189 | 2.6 | 0.02 | 80.5 |

Note
*outside scope of the present invention,
**amount as CaO

As is apparent from the results shown in Table 2, in each of sample No. 15 and sample No. 16 where Y$_2$O$_3$ having an evaporation rate lower than 10$^{-6}$ g/cm$^2$·sec at 1900° C. was used, the density was high, but the sintering aid was left in an amount larger than 2.0% by weight, and occurrence of color unevenness and stain was conspicuous and the heat conductivity was low.

In sample No. 1 where the amount added of the sintering aid was smaller than 3% by weight, sintering was insufficient and a high heat conductivity was not attained. In sample No. 7 where the amount added for the sintering aid was larger than 15% by weight, the residual amount of the sintering aid was large and occurrence of color unevenness and stain was observed. It also was found that even if the amount added of the sintering aid was in the range of from 3 to 15% by weight, in sample No. 14 where evaporation was inhibited, the residual amount of the sintering aid exceeded 0.1% by weight and no high heat conductivity could be obtained.

In each of sample Nos. 2 through 6 and 8 through 13 according to the present invention, the apparent density was 3.2 to 3.3 g/cm$^3$ and the heat conductivity was at least 200 W/m·k, and occurrence of color unevenness and stain was not observed. Especially in the samples where the residual amount of Er was smaller than 0.1% by weight and the residual amount of Ca was smaller than 0.05% by weight, the heat conductivity was higher than 200 W/m·k and higher effects were attained.

EXAMPLE 3

A commercially available starting aluminum nitride powder having an oxygen content lower than 1.5% by weight and a carbon content lower than 0.15% by weight, in which the content of cation impurities other than aluminum was lower than 0.1% by weight, was mixed with Yb$_2$O$_3$ and CaCO$_3$ in amounts shown in Table 3. The obtained powder mixture was compressed under a pressure of 1000 kg/cm$^2$ at room temperature to form a molded body. The molded body was fired under atmospheric pressure at 1900° C. in a nitrogen gas atmosphere containing carbon. The temperature was elevated at a temperature-elevating rate of 20° C./min from 1200° C. to the sintering temperature at the firing step.

It was confirmed with respect to each sample that a reaction product (aluminate) with Al$_2$O$_3$ was formed at this temperature-elevating rate. After arrival at the sintering temperature, firing was carried out for 5 hours in the state where the atmosphere was substituted with nitrogen gas. The rate of dropping of the temperature to 1200° C. was set at 20° C./min. In sample No. 14, carbon was not incorporated in the atmosphere. With respect to the obtained aluminum nitride sintered body, the density was measured by the Archimedian method, the heat conductivity was measured by the laser flash method, and the ratio of occurrence of color unevenness and stain was determined by the observation using a binocular microscope. The obtained results are shown in Table 3.

Furthermore, the amount of the sintering aid (as the metal) in the sintered body was measured by the ICI emission spectroscopic analysis. The obtained results are shown in Table 3.

TABLE 3

| Sample No. | Composition (% by weight) | | | Properties of Sintered Body | | | | |
|---|---|---|---|---|---|---|---|---|
| | AlN | Yb$_2$O$_3$ | CaCO$_3$** | apparent density (g/cm$^3$) | heat conductivity (W/m·k) | residual amount (% by weight of Er) | residual amount (% by weight of Ca) | ratio (%) of occurrence of color unevenness and stain |
| *1 | 98.825 | 1.0 | 0.175 | 3.17 | 131 | 0.01 | 0.007 | 0.0 |
| 2 | 96.825 | 3.0 | 0.175 | 3.25 | 201 | 0.02 | 0.009 | 0.0 |
| 3 | 94.825 | 5.0 | 0.175 | 3.26 | 206 | 0.02 | 0.011 | 0.0 |
| 4 | 92.825 | 7.0 | 0.175 | 3.26 | 211 | 0.03 | 0.010 | 0.0 |
| 5 | 89.825 | 10.0 | 0.175 | 3.26 | 218 | 0.05 | 0.004 | 0.0 |
| 6 | 84.825 | 15.0 | 0.175 | 3.26 | 212 | 0.08 | 0.008 | 0.0 |
| *7 | 79.825 | 20.0 | 0.175 | 3.31 | 159 | 0.59 | 0.015 | 11.8 |

TABLE 3-continued

| Sample No. | Composition (% by weight) | | | Properties of Sintered Body | | | | |
|---|---|---|---|---|---|---|---|---|
| | AlN | Yb$_2$O$_3$ | CaCO$_3$** | apparent density (g/cm$^3$) | heat conductivity (W/m·k) | residual amount (% by weight of Er) | residual amount (% by weight of Ca) | ratio (%) of occurrence of color unevenness and stain |
| 8 | 92.99 | 7.0 | 0.01 | 3.26 | 208 | 0.03 | 0.004 | 0.0 |
| 9 | 92.95 | 7.0 | 0.05 | 3.26 | 210 | 0.03 | 0.005 | 0.0 |
| 10 | 92.90 | 7.0 | 0.10 | 3.26 | 213 | 0.03 | 0.004 | 0.0 |
| 11 | 92.85 | 7.0 | 0.15 | 3.26 | 215 | 0.03 | 0.012 | 0.0 |
| 12 | 92.80 | 7.0 | 0.18 | 3.26 | 216 | 0.03 | 0.034 | 0.0 |
| 13 | 92.50 | 7.0 | 0.02 | 3.26 | 183 | 0.03 | 0.053 | 0.0 |
| *14 | 92.825 | 7.0 | 0.175 | 3.33 | 145 | 3.18 | 0.145 | 30.0 |
| | | Y$_2$O$_3$ | | | | Y | | |
| *15 | 94.825 | 5.0 | 0.175 | 3.29 | 194 | 2.1 | 0.02 | 67.0 |
| *16 | 92.825 | 7.0 | 0.175 | 3.31 | 189 | 2.6 | 0.02 | 80.5 |

Note
*outside scope of the present invention,
**amount as CaO

As is apparent from the results shown in Table 3, in each of sample No. 15 and sample No. 16 where Y$_2$O$_3$ having an evaporation rate lower than 10$^{-6}$ g/cm$^2$·sec at 1900° C. was used, the density was high, but the sintering aid was left in an amount larger than 2.0% by weight, and occurrence of color unevenness and stain was conspicuous and the heat conductivity was low.

In sample No. 1 where the amount added of the sintering aid was smaller than 3% by weight, sintering was insufficient and a high heat conductivity was not attained. In sample No. 7 where the amount added of the sintering aid was larger than 15% by weight, the residual amount of the sintering aid was large and occurrence of color unevenness and stain was observed. It also was found that even if the amount added of the sintering aid was in the range of from 3 to 15% by weight, in sample No. 14 where evaporation was inhibited, the residual amount of the sintering aid exceeded 0.1% by weight and no high heat conductivity could be obtained.

In each of sample Nos. 2 through 6 and 8 through 13 according to the present invention, the apparent density was 3.2 to 3.3 g/cm$^3$ and the heat conductivity was at least 170 W/m·k, and occurrence of color unevenness and stain was not observed. Especially, in the samples where the residual amount of Yb was smaller than 0.1% by weight and the residual amount of Ca was smaller than 0.05% by weight, the heat conductivity was higher than 200 W/m·k and higher effects were attained.

We claim:

1. An aluminum nitride sintered body consisting essentially of: aluminum nitride and a sintering aid, wherein the sintered aid is composed of at least one component selected from the group consisting of Yb$_2$O$_3$ and Er$_2$O$_3$, and the sintered body contains up to 0.5% by weight of Yb and/or Er as the metal and has a density of 3.2 to 3.3 g/cm$^3$ and a heat conductivity of at least 170 W/m·K.

2. An aluminum nitride sintered body as set forth in claim 1, wherein the content of Yb and/or Er as the metal is from 0.01% to 0.2% by weight.

3. An aluminum nitride sintered body consisting essentially of: aluminum nitride and a sintering aid, wherein the sintering aid is composed of at least one component selected from the group consisting of Yb$_2$O$_3$ and Er$_2$O$_3$ and a CaO component, and the sintered body contains up to 0.5% by weight of Yb and/or Er as the metal and up to 0.1% by weight of Ca as the metal and has a density of 3.2 to 3.3 g/cm$^3$ and a heat conductivity of at least 170 W/m·K.

4. An aluminum nitride sintered body as set forth in claim 3, wherein the content of Yb and/or Er as the metal is up to 0.1% by weight and the content of Ca as the metal is up to 0.05% by weight, and the heat conductivity is at least 200 W/m·K.

5. An aluminum nitride sintered body according to claim 1 wherein the sintered body contains from 0.02% to 0.5% by weight of Yb and/or Er as the metal.

6. An aluminum nitride sintered body according to claim 1 wherein the sintered body contains from 0.01% to 0.2% by weight of Yb and/or Er as the metal.

7. An aluminum nitride sintered body according to claim 1 wherein the sintered body contains from 0.02% to 0.2% by weight of Yb and/or Er as the metal.

8. An aluminum nitride sintered body according to claim 3 wherein the sintered body contains from 0.01 to 0.5% by weight of Yb and/or Er as the metal.

9. An aluminum nitride sintered body according to claim 3 wherein the sintered body contains from 0.01 to 0.2% by weight of Yb and/or Er as the metal.

10. An aluminum nitride sintered body according to claim 3 wherein the sintered body contains from 0.02 to 0.2% by weight of Yb and/or Er as the metal.

11. An aluminum nitride sintered body according to claim 3 wherein the sintered body contains from 0.01 to 0.5% by weight of Yb and/or Er as the metal and from 0.01 to 0.1% by weight of Ca as the metal.

12. An aluminum nitride sintered body according to claim 3 wherein the sintered body contains from 0.01 to 0.1% by weight of Yb and/or Er as the metal and from 0.0005 to 0.0003% by weight of Ca as the metal.

13. An aluminum nitride sintered body according to claim 3 wherein the sintered body contains from 0.01 to 0.04% by weight of Yb and/or Er as the metal, and from 0.001 to 0.003% by weight of Ca as the metal.

14. An aluminum nitride sintered body consisting essentially of: aluminum nitride and a sintering aid wherein the sintering aid is composed of a compound of Yb and/or Er capable of being converted to an oxide of Yb and/or Er at the firing temperature, and the sintered body contains from 0.01 to 0.5% by weight of Yb and/or Er as the metal and has a density of 3.2 to 3.3 grams per cubic centimeter and a heat conductivity of at least 170 W/m·K.

15. An aluminum nitride sintered body according to claim 14 wherein the Yb and/or Er compound is selected from the group consisting of ytterbium oxide, ytterbium carbonate, ytterbium nitrate, ytterbium hydroxide, erbium oxide, erbium carbonate, erbium nitrate and erbium hydroxide.

16. An aluminum nitride sintered body consisting essentially of: aluminum nitride and a sintering aid wherein the sintering aid is composed of at least one component selected from the group consisting of ytterbium oxide, ytterbium carbonate, ytterbium nitrite, ytterbium hydroxide, erbium oxide, erbium carbonate, erbium nitrate and erbium hydroxide, and a CaO component, and wherein the sintered body contains from 0.01 to 0.5% by weight of ytterbium and/or erbium as the metal, and from 0.0005 to 0.1% by weight of Ca as the metal, and has a density of 3.2 to 3.3 grams per cubic centimeter and a heat conductivity of at least 170 W/m·K.

17. A process for the preparation of an aluminum nitride sintered body, which comprises molding a composition comprising 85 to 97% by weight of an aluminum nitride powder and 3 to 15% by weight of a sintering aid selected from the group consisting of $Yb_2O_3$ and $Er_2O_3$ and firing the obtained molded body at a temperature of 1600° to 2000° C. in an non-oxidizing atmosphere containing at least 1 Torr of nitrogen gas to thereby evaporate the sintering aid until the content of Yb and/or Er as the metal in the sintered body is up to 0.5% by weight, and wherein at the step of firing the molded body, the average temperature-elevating rate from 1200° C. to the sintering temperature is lower than 40° C./min.

18. A process according to claim 17, wherein carbon is incorporated in the non-oxidizing atmosphere and sintering of the molded body is effected in said atmosphere.

19. A process according to claim 17, wherein the composition to be molded comprises 90 to 95% by weight of the aluminum nitride powder and 5 to 10% by weight of the sintering aid.

20. A process for the preparation of an aluminum nitride sintered body, which comprises molding a composition comprising 85 to 97% by weight of aluminum nitride powder, 3 to 15% by weight of a first sintering aid selected from the group consisting of $Yb_2O_3$ and $Er_2O_3$ and a second sintering aid comprising 0.01 to 0.2% by weight of a calcium compound capable of being converted to CaO under sintering conditions, firing the obtained molded body in a non-oxidizing atmosphere to thereby evaporate the sintering aids until the content of Yb and/or Er as the metal in the sintered body is up to 0.5% by weight and the content of Ca as the metal is up to 0.1% by weight, and wherein at the step of firing the molded body, the average temperature-elevating rate from 1200° C. to the sintering temperature is lower than 40° C./min.

21. A process according to claim 20, wherein carbon is incorporated in the non-oxidizing atmosphere and sintering of the molded body is effected in said atmosphere.

22. A process according to claim 20, wherein at the step of firing the molded body, the average temperature-elevating rate from 1200° C. to the sintering temperature is lower than 40° C./min.

23. A process for producing an aluminum nitride sintered body, the process including the following steps:
molding a composition consisting essentially of aluminum nitride powder, and a sintering aid selected from the group consisting of Yb compounds and Er compounds capable of being converted to oxides of such compounds under firing conditions; and
firing the obtained molded body at a temperature of 1600°-2000° C. in a non-oxidizing atmosphere containing at least one Torr of nitrogen gas to thereby evaporate the sintering aid until the content of Yb and/or Er as the metal in the sintered body ranges from 0.01 to 0.05% by weight as the metal, wherein at the step of firing the molded body, the average temperature-elevating rate from 1200° C. to the sintering temperature is lower than 40° C./min.

24. A process according to claim 23 wherein the Yb and Er compounds are selected from the group consisting of ytterbium oxide, ytterbium carbonate, ytterbium nitrate, ytterbium hydroxide, erbium oxide, erbium carbonate, erbium nitrate and erbium hydroxide.

25. A process according to claim 24 wherein there is present 85 to 97% by weight of aluminum nitride powder and 3 to 15% by weight of the sintering aid.

26. A process according to claim 25 further including from 0.01 to 0.2% by weight of a calcium compound capable of being converted to CaO under sintering conditions.

27. An aluminum nitride sintered body produced by the process of claim 17.

28. An aluminum nitride sintered body produced by the process of claim 18.

29. An aluminum nitride sintered body produced by the process of claim 19.

30. An aluminum nitride sintered body produced by the process of claim 20.

31. An aluminum nitride sintered body produced by the process of claim 21.

32. An aluminum nitride sintered body produced by the process of claim 22.

33. An aluminum nitride sintered body produced by the process of claim 23.

34. An aluminum nitride sintered body produced by the process of claim 24.

35. An aluminum nitride sintered body produced by the process of claim 25.

36. An aluminum nitride sintered body produced by the process of claim 26.

* * * * *